(12) United States Patent
Wagoner et al.

(10) Patent No.: US 9,312,682 B2
(45) Date of Patent: Apr. 12, 2016

(54) SYSTEM AND METHOD FOR OVERVOLTAGE PROTECTION

(75) Inventors: Robert Gregory Wagoner, Roanoke, VA (US); Allen Michael Ritter, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 467 days.

(21) Appl. No.: 13/470,564

(22) Filed: May 14, 2012

(65) Prior Publication Data

US 2013/0301177 A1  Nov. 14, 2013

(51) Int. Cl.
*H02H 3/20* (2006.01)
*H02H 7/06* (2006.01)
*H02H 9/04* (2006.01)

(52) U.S. Cl.
CPC .............. *H02H 7/067* (2013.01); *H02H 9/041* (2013.01)

(58) Field of Classification Search
CPC ..................................... H02H 3/20; H02J 3/38
See application file for complete search history.

(56) References Cited

U.S. PATENT DOCUMENTS

| | | | |
|---|---|---|---|
| 3,793,535 A * | 2/1974 | Chowdhuri | 361/111 |
| 4,479,084 A * | 10/1984 | Ogawa et al. | 323/210 |
| 4,616,286 A * | 10/1986 | Breece | 361/56 |
| 5,245,500 A | 9/1993 | Rozman | |
| 5,473,494 A * | 12/1995 | Kurosawa et al. | 361/3 |
| 6,429,546 B1 * | 8/2002 | Ropp et al. | 307/31 |
| 6,603,290 B2 | 8/2003 | Hochgraf | |
| 6,810,339 B2 | 10/2004 | Wills | |
| 6,815,932 B2 | 11/2004 | Wall | |
| 6,850,074 B2 | 2/2005 | Adams et al. | |
| 7,102,247 B2 | 9/2006 | Feddersen et al. | |
| 7,106,564 B2 | 9/2006 | Deng et al. | |
| 7,138,728 B2 | 11/2006 | LeRow et al. | |
| 7,225,087 B1 * | 5/2007 | Siciliano et al. | 702/58 |
| 7,408,268 B1 | 8/2008 | Nocentini et al. | |
| 7,859,125 B2 | 12/2010 | Nielsen et al. | |
| 7,899,632 B2 | 3/2011 | Fornage et al. | |
| 7,945,413 B2 | 5/2011 | Krein | |
| 8,093,742 B2 | 1/2012 | Gupta | |
| 2010/0091417 A1 | 4/2010 | Letas | |
| 2011/0141641 A1 | 6/2011 | Walling et al. | |
| 2013/0169068 A1 * | 7/2013 | Wagoner et al. | 307/126 |

FOREIGN PATENT DOCUMENTS

EP   1 752 660 A1   2/2007
EP   2301143 B1   11/2011
WO   WO 2013/102012 A1   7/2013

OTHER PUBLICATIONS

Danish Patent Office Search Report, Oct. 1, 2014.

* cited by examiner

*Primary Examiner* — Zeev V Kitov
(74) *Attorney, Agent, or Firm* — Dority & Manning, P.A.

(57) ABSTRACT

In one aspect, the present subject matter discloses a method for overvoltage protection of an electrical system. The method may generally include detecting an overvoltage condition on an electrical system; and switching on, in response to the detected overvoltage condition, an impedance connected to the electrical system, wherein the impedance clamps voltage on the electrical system.

15 Claims, 6 Drawing Sheets

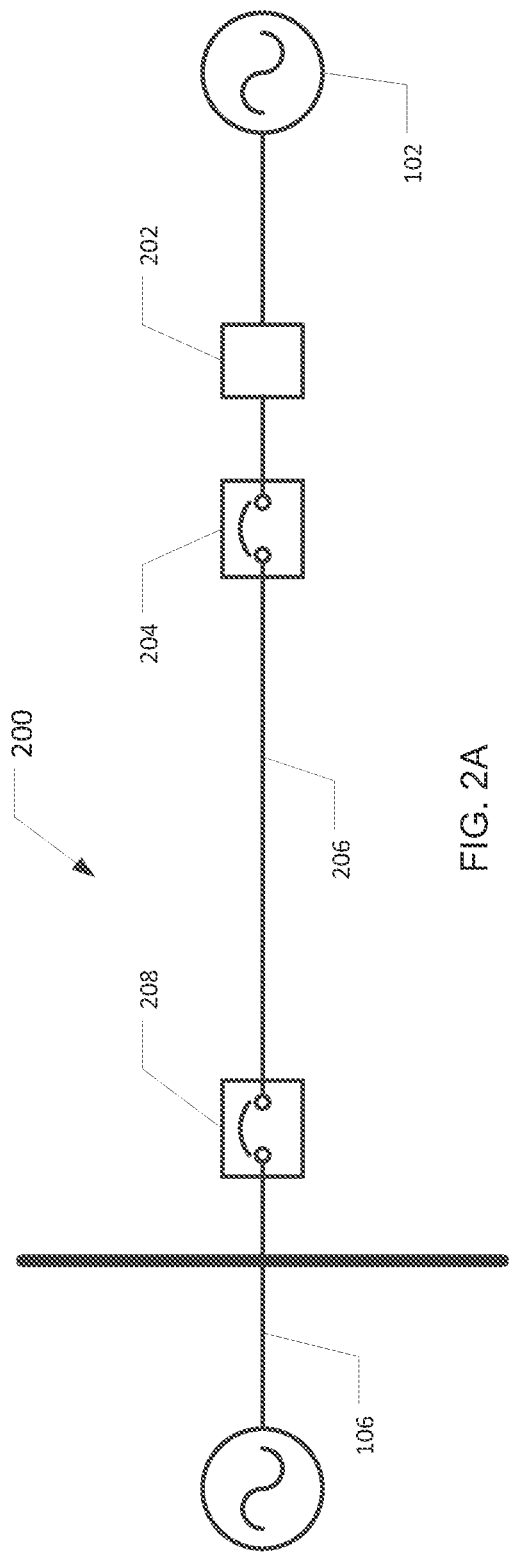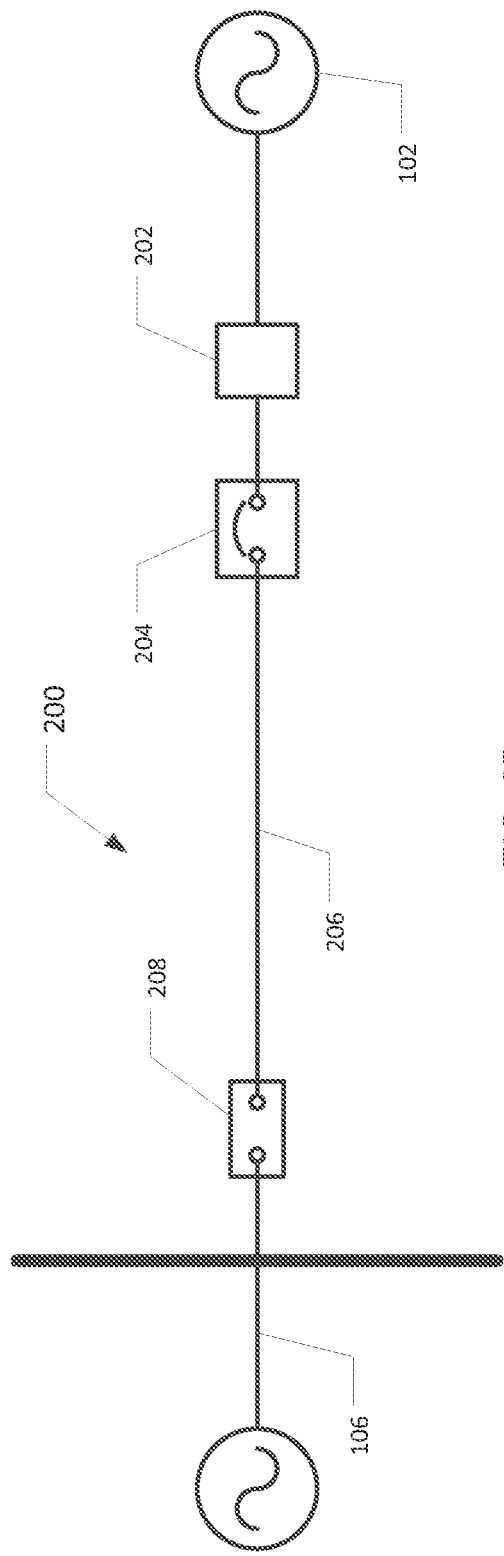

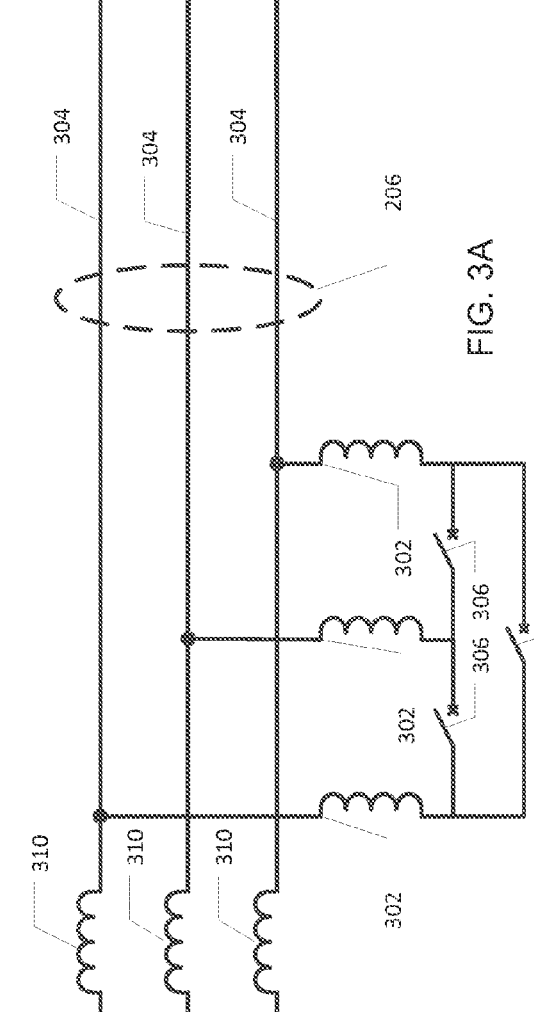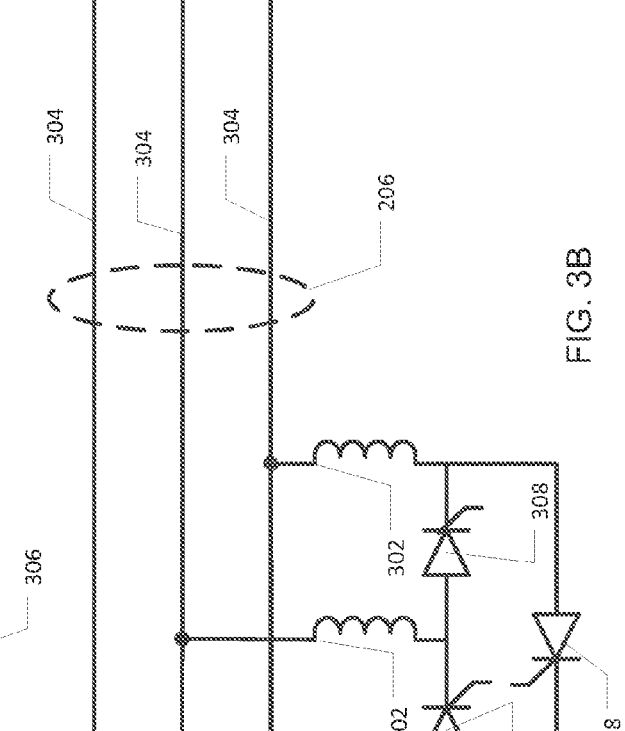
FIG. 3A
FIG. 3B

SYSTEM AND METHOD FOR OVERVOLTAGE PROTECTION

FIELD OF THE INVENTION

The present subject matter relates generally to electrical generation and, more particularly, to a system and method for limiting overvoltage events during islanding of one or more sources of electrical generation.

BACKGROUND OF THE INVENTION

In some instances, sources of electrical generation may be located in remote areas far from the loads they serve. This is particularly true for renewable energy sources such as wind turbine generators, solar/photovoltaic generation, hydroelectric generators, and the like. Typically, these sources of generation are connected to the electrical grid through an electrical system such as long transmission lines. These transmission lines are connected to the grid using one or more breakers. Sudden tripping of the transmission line breaker at the grid side while the source of generation is under heavy load may result in an overvoltage on the transmission line that can lead to damage to the source of generation or equipment associated with the source of generation such as converters and inverters.

Accordingly, an improved system and/or method that provides for sufficient voltage limitation to prevent damaging the sources of generation and equipment associated with the sources of generation would be welcomed in the technology.

BRIEF DESCRIPTION OF THE INVENTION

Aspects and advantages of embodiments of the invention will be set forth in part in the following description, or may be obvious from the description, or may be learned through practice of the invention.

In one aspect, the present subject matter discloses a method for overvoltage protection of an electrical system. The method may generally include detecting an overvoltage condition on an electrical system; and switching on, in response to the detected overvoltage condition, an impedance connected to the electrical system, wherein the impedance clamps voltage on the electrical system.

In another aspect, the present subject matter discloses a method for overvoltage protection for a grid-islanding event of an electrical system. The method may generally include detecting a grid islanding event on a poly-phase electrical system, wherein the grid islanding event is caused by disconnecting of one or more sources of electrical generation from an electrical grid; switching on, in response to the detected grid islanding event, an impedance connected between each phase of the poly-phase electrical system, wherein a overvoltage caused by the grid islanding event is limited by the impedance clamping voltage on the poly-phase electrical system; and switching off the impedance connected between each phase of the poly-phase electrical system when the overvoltage event drops below a threshold voltage value.

In another aspect, the present subject matter discloses a system for overvoltage protection of an electrical system. The system may be comprised of one or more impedance elements; one or more switches in series with the one or more impedance elements; and a controller, wherein the controller is configured to: receive an indication of a detection of an overvoltage condition on an electrical system; and cause the one or more switches to connect the one or more impedance elements to the electrical system in response to receiving the indication of the detected overvoltage condition, wherein the overvoltage condition is limited by the one or more impedance elements clamping voltage on the electrical system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2A is a simplified single-line diagram of an electrical power system network;

FIG. 2B illustrates the electrical power system network of FIG. 2A, where the grid-side breaker has opened;

FIG. 3A illustrates a simplified form of a three-line diagram of an embodiment of an electrical network further comprising an embodiment of a system for overvoltage protection;

FIG. 3B illustrates a simplified form of a three-line diagram of an embodiment of an electrical network further comprising an embodiment of a system for overvoltage protection, wherein the one or more switches are comprised of three SCRs;

DETAILED DESCRIPTION OF THE INVENTION

Figure 1:
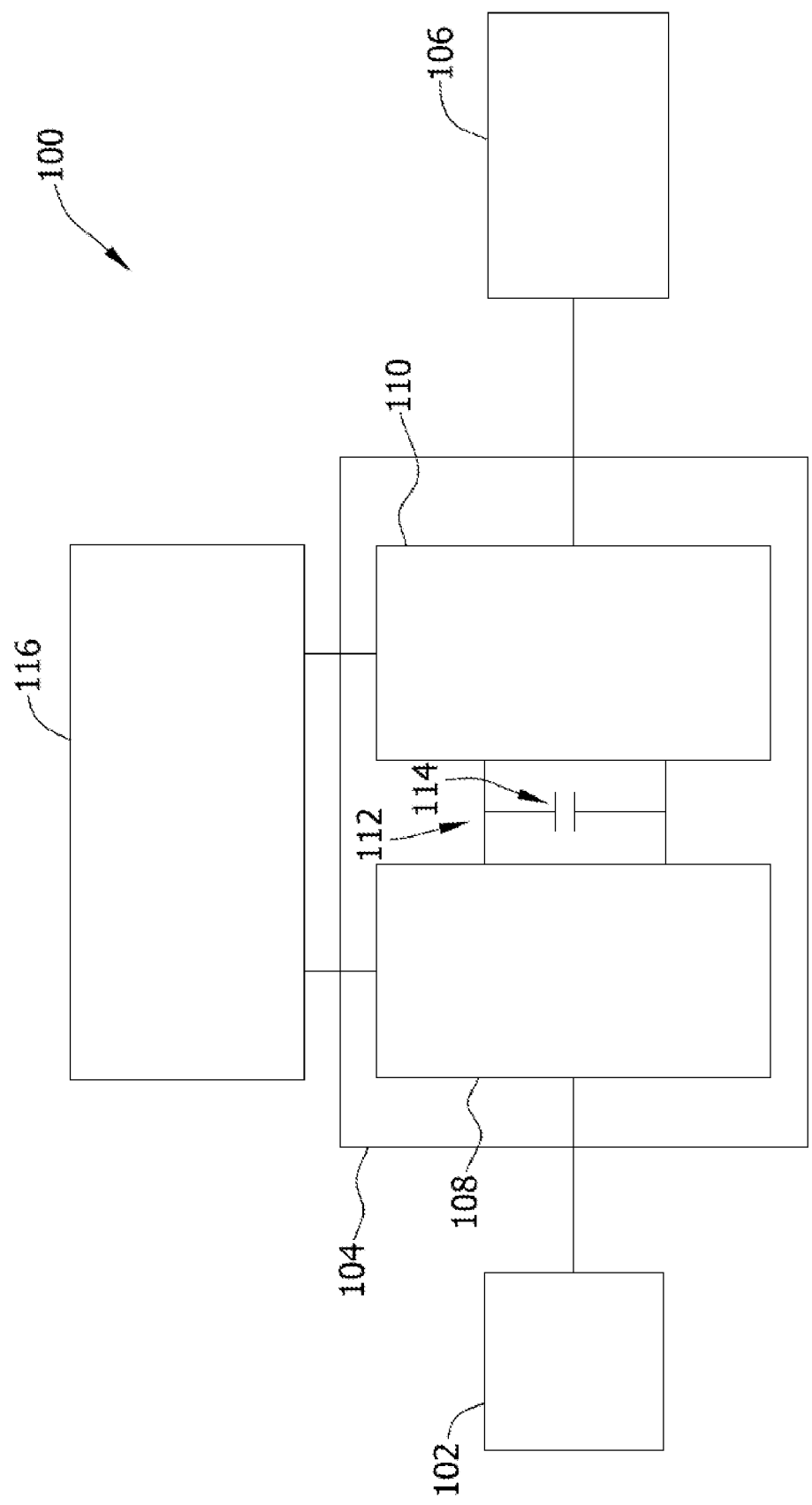
FIG. 1 is a schematic diagram of an exemplary power generation system that includes at least one power generation unit.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Before the present methods and systems are disclosed and described, it is to be understood that the methods, systems and computer program products are not limited to specific synthetic methods, specific components, or to particular compositions. It is also to be understood that the terminology used herein is for describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

In general, the present subject matter is directed to a system and methods for limiting voltage on an electrical system. In particular, aspects of the invention are directed at limiting voltage on an electrical system caused by the islanding of one or more sources of electrical generation. Islanding occurs when one or more sources of electrical generation such as a wind park comprised of one or more wind turbine generators abruptly and unexpectedly is disconnected with the electrical grid. For example, islanding can occur when a breaker on the grid side of an electrical system such as a transmission line opens thereby disconnecting the one or more sources of electrical generation from the grid. This can result in high voltages on the electrical system. If the one or more sources of electrical generation utilize an AC-DC converter and/or a DC to AC inverter, then high voltages can occur on the DC link that connects the converter and inverter (if used) and can damage converter and/or inverter components. This can be more readily seen with reference to FIG. 1.

FIG. 1 is a schematic diagram of an exemplary power generation system 100 that includes at least one power generation unit 102. Power generation unit 102 includes a wind turbine, a solar panel or array, a fuel cell, a geothermal generator, a hydropower generator, and/or any other device that generates electrical power. More specifically, in the exemplary embodiment, power generation unit 102 can be a device that generates direct current (DC) electrical power from at least one renewable energy source. Alternatively, power generation unit 102 is a gas turbine, a steam turbine, and/or any other device that generates DC or alternating current (AC) power from a renewable or non-renewable energy source.

In the exemplary embodiment, power generation unit 102 is coupled to a power converter system 104, or a power converter 104. DC power generated by power generation unit 102 is transmitted to power converter system 104, and power converter system 104 converts the DC power to AC power. The AC power is transmitted to an electrical transmission and distribution network 106, or "grid." Power converter system 104, in the exemplary embodiment, adjusts an amplitude of the voltage and/or current of the converted AC power to an amplitude suitable for electrical transmission and distribution network 106, and provides AC power at a frequency and a phase that are substantially equal to the frequency and phase of electrical transmission and distribution network 106. Moreover, in the exemplary embodiment, power converter system 104 provides three phase AC power to electrical transmission and distribution network 106. Alternatively, power converter system 104 provides single phase AC power or any other number of phases of AC power to electrical transmission and distribution network 106.

In the exemplary embodiment, power converter system 104 includes a DC to DC, or "boost," converter 108 and an inverter 110 coupled together by a DC bus 112. Alternatively, power converter system 104 may include an AC to DC converter 108 for use in converting AC power received from power generation unit 102 to DC power, and/or any other converter 108 that enables power converter system 104 to function as described herein. In one embodiment, power converter system 104 does not include converter 108, and inverter 110 is coupled to power generation unit 102 by DC bus 112 and/or by any other device or conductor. In the exemplary embodiment, inverter 110 is a DC to AC inverter 110 that converts DC power received from converter 108 into AC power for transmission to electrical transmission and distribution network 106. Moreover, in the exemplary embodiment, DC bus 112 includes at least one capacitor 114. Alternatively, DC bus 112 includes a plurality of capacitors 114 and/or any other electrical power storage devices that enable power converter system 104 to function as described herein. As current is transmitted through power converter system 104, a voltage is generated across DC bus 112 and energy is stored within capacitors 114.

Power converter system 104 includes a control system 116 coupled to converter 108 and/or to inverter 110. In the exemplary embodiment control system 116 includes and/or is implemented by at least one processor. As used herein, the processor includes any suitable programmable circuit such as, without limitation, one or more systems and microcontrollers, microprocessors, reduced instruction set circuits (RISC), application specific integrated circuits (ASIC), programmable logic circuits (PLC), field programmable gate arrays (FPGA), and/or any other circuit capable of executing the functions described herein. The above examples are exemplary only, and thus are not intended to limit in any way the definition and/or meaning of the term "processor."

In the exemplary embodiment, control system 116 controls and/or operates converter 108 to adjust or maximize the power received from power generation unit 102. Moreover, in the exemplary embodiment, control system 116 controls and/or operates inverter 110 to regulate the voltage across DC bus 112 and/or to adjust the voltage, current, phase, frequency, and/or any other characteristic of the power output from inverter 110 to substantially match the characteristics of electrical transmission and distribution network 106.

During an islanding event, power generation unit 102 becomes disconnected from the grid 106. This can result in an overvoltage on the electrical system that connects the generation unit 102 with the grid 106. An overvoltage can be a short-term or longer duration increase in the measured voltage of the electrical system over its nominal rating. For example, the overvoltage may be 1%, 5% 10%, 50% or greater, and any values therebetween, of the measured voltage over the nominal voltage. This overvoltage on the AC side of the inverter 108 causes energy to be pumped into capacitors 114, thereby increasing the voltage on the DC link 112. The higher voltage on the DC link 112 can damage one or more electronic switches such as a gate turn-off (GTO) thyristor, gate-commutated thyristor (GCT), insulated gate bipolar transistor (IGBT), MOSFET, combinations thereof, and the like located within the inverter 110 and/or converter 108.

FIG. 2A is a simplified single-line diagram of an electrical power system network 200. In this exemplary arrangement, the electrical generation unit 102 is connected to the grid 106 through a transformer 202 that steps up or steps down the AC power created by the generation unit 102 alone or in cooperation with a convertor 110 and/or inverter 108. AC power is routed through a generator-side breaker 204, a transmission line 206, a grid side breaker 208 and to the grid 106. Components of the network 200 can be comprised of AC single phase, AC poly-phase or DC electrical apparatus, as needed. For example, the transmission line 206 may be a three-phase (AC) transmission line. As shown, both the generator-side breaker 204 and the grid-side breaker 208 are closed.

FIG. 2B illustrates the electrical power system network 200 of FIG. 2A, where the grid-side breaker 208 has opened. This can be the result of a fault on the grid 106, a fault on the transmission line 206, a malfunction of the grid-side breaker 208, an accidental opening of the breaker 208, and the like. The transmission line 206 may also be opened by an open circuit fault such as that caused by cutting or breaking the transmission line 206. Such an open circuit condition, whatever the cause, can create an overvoltage on the affected phases of the transmission line 206 if the electrical generation unit 102 is under load and producing power at the time of the open circuit event. In some instances, the controller may not recognize the open circuit or islanding event, or may react too slowly to the event, and damage may occur to components that comprise the electrical system. In particular, electronic switches used in a convertor 110 and/or inverter 108 may be damaged during the overvoltage.

FIG. 3A illustrates a simplified form of a three-line diagram of an embodiment of an electrical network 200 further comprising an embodiment of a system for overvoltage protection. In this embodiment, the overvoltage system comprises one or more impedance elements 302 connected between the phases 304 of the electrical system 206. Though the electrical system 206 illustrates three phases, it is to be appreciated that embodiments of the present invention can be configured to adapt to any single-phase or poly-phase electrical system. The shown embodiment further comprises one or more switches 306 in series with the one or more impedance elements 302. In one aspect, the switches 306 can be one or more electronic or mechanical switches or combinations thereof. For example, the switches can be mechanical switches that are controlled by motors, springs, and the like. In another aspect, the switches 306 can be electronic switches such as silicon controller rectifiers (SCRs) that are controlled by a gate, as are known in the art. Other electronic switches that may be suitable include integrated gate-commutated thyristors (IGCTs), insulated gate bipolar transistors (IGBTs), and the like. FIG. 3B illustrates a simplified form of a three-line diagram of an embodiment of an electrical network 200 further comprising an embodiment of a system for overvoltage protection, wherein the one or more switches 306 are comprised of three SCRs 308.

Figure 3C:
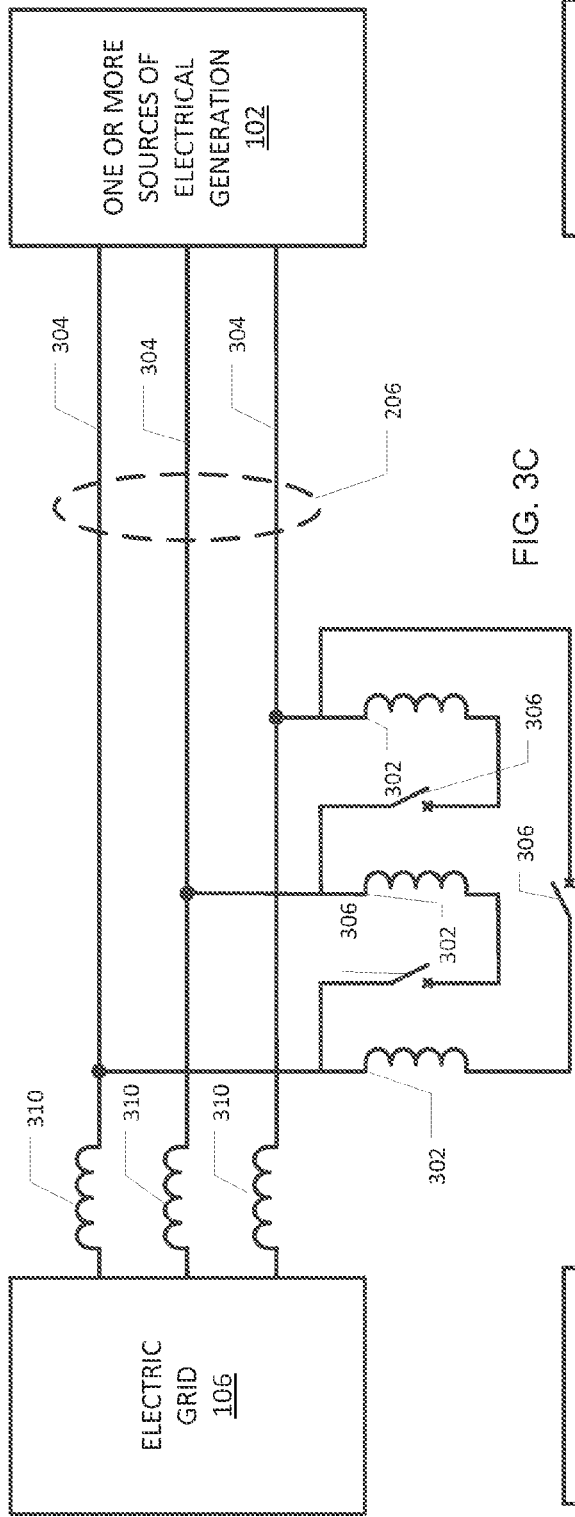
FIGS. 3C and 3D illustrate alternate embodiments of simplified forms of three-line diagrams of embodiments of an electrical network further comprising embodiments of systems for overvoltage protection.

Returning to FIG. 3A, the impedance elements 302 can be comprised of resistance elements, inductive elements, or combinations thereof. Generally, the impedance elements 302 can be connected between each phase 304 of a poly-phase electrical system 206. The impedance elements 302 can be sized based at least in part on a voltage of the electrical system 206, impedance of the electrical system 310 to the point where the impedance elements 302 are connected to the electrical system 206, current supplied by any sources of electrical generation 102 connected to the electrical system 206, and a desired clamping level of the overvoltage condition. Though not shown in FIG. 3A (or FIGS. 3B, 3C and 3D), switches 306 can be controlled (i.e., placed in a conducting or non-conducting state) by commands from a controller. In one aspect, the controller can be configured to receive an indication of a detection of an overvoltage condition on an electrical system 206; and cause the one or more switches 306 to connect the one or more impedance elements 302 to the electrical system 206 in response to receiving the indication of the detected overvoltage condition, wherein the overvoltage condition is limited by the one or more impedance elements 302 clamping voltage on the electrical system. In this way, the impedance elements 302 act as a voltage divider for the phases of the electrical system 206 (in conjunction with the line impedance 310), and thus the desired clamping level can be set by sizing the impedance elements 302 to the desired level. In one aspect, the overvoltage condition on the electrical system 206 can be caused by islanding of one or more sources of electrical generation 102 from an electrical grid 106. In various aspects, the one or more sources of electrical generation 102 can comprise one or more wind turbine generators, one or more sources of solar/photovoltaic generation, one or more hydroelectric generators, one or more gas turbine generators, one or more steam turbine generators, combinations thereof, and the like. FIGS. 3A and 3B generally illustrate the impedance elements 302 connected in a wye configuration. This configuration has the advantages of lower voltage stress on the SCR 308 or switch 306 because L-N voltage is lower than L-L voltage.

Figure 3D:
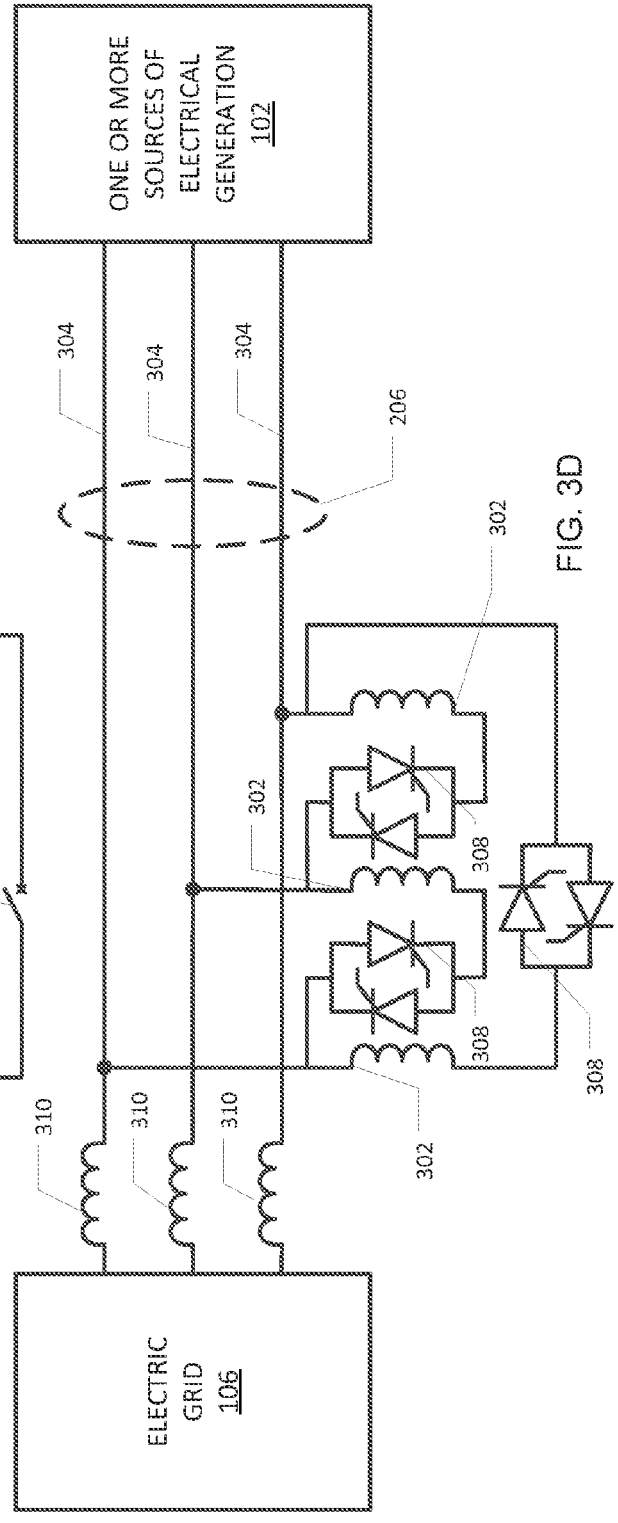

FIGS. 3C and 3D illustrate alternate embodiments of simplified forms of three-line diagrams of embodiments of an electrical network 200 further comprising embodiments of systems for overvoltage protection. The configuration illustrated in FIGS. 3C and 3D allow a single impedance element 302 to be connected between the phases 304 of the electrical system 206. This can be compared to FIGS. 3A and 3B where two impedance elements 302 are connected in series between two phases when the switches 306 are in a conducting state. In FIG. 3D, the overvoltage system comprises two SCRs 308 per impedance element. FIGS. 3C and 3D illustrate the impedance elements 302 connected in a delta configuration. This configuration has the advantages of redundancy, such that any one of the SCRs 308 or switches 306 can fail, and the remaining two of the three switches will still provide a short circuit across all three phases (if the component values are designed/selected to take advantage of this redundancy). Similarly, if any one of the impedance elements 302 or the wiring in any phase fails open, the remaining phases can still provide a short circuit to limit the voltage across all the phases. To do this, the value of impedance element 302 is lower to limit the total voltage to a desired level. Also the current rating of the switches 306 must be higher to allow them to carry the total current in two switches, which would have been divided between three switches when all three are working properly.

Advantages of embodiments of this invention in general include being less expensive than adding dynamic braking to every wind turbine in the wind farm. It allows for a single control to decide when to operate it, which avoids any problems of individual turbines acting independently. In other words, avoids any possibility of the sources of electrical generation 102 fighting each other, some turning on and off at different times. This also offers the advantage of higher reliability and higher availability because it requires fewer components than adding dynamic braking to every sources of electrical generation 102 such as every wind turbine in a wind farm.

Figure 4:
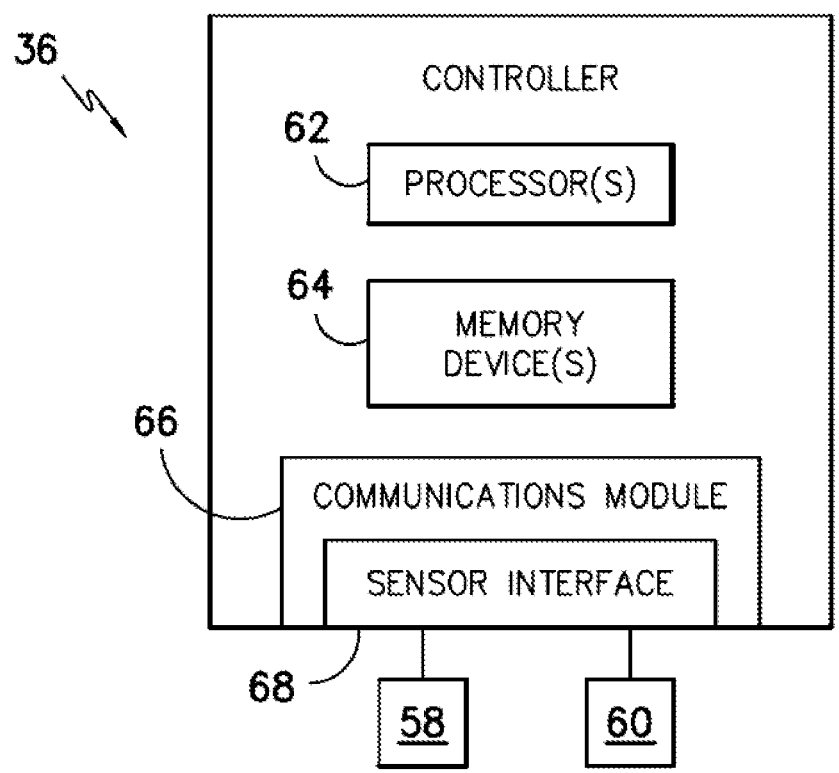
FIG. 4 illustrates a schematic diagram of one embodiment of a controller.

Referring now to FIG. 4, as noted above, some embodiments of systems for overvoltage protection can include a control system or controller 36. In general, the controller 36 may comprise a computer or other suitable processing unit. Thus, in several embodiments, the controller 36 may include suitable computer-readable instructions that, when implemented, configure the controller 36 to perform various different functions, such as receiving, transmitting and/or executing control signals. As such, the controller 36 may generally be configured to control the various operating modes (e.g., conducting or non-conducting states) of the one or more switches 306 and/or components of embodiments of the overvoltage protection system. For example, the controller 36 may be configured to implement methods of operating embodiments of the overvoltage protection system.

FIG. 4 illustrates a block diagram of one embodiment of suitable components that may be included within an embodiment of a controller 36, or any other controller that receives signals indicating overvoltage and/or islanding conditions in accordance with aspects of the present subject matter. In various aspects, such signals can be received from one or more sensors 58, 60, or may be received from other computing devices (not shown) such as a supervisory control and data acquisition (SCADA) system, a turbine protection system, and the like. As shown, the controller 36 may include one or more processor(s) 62 and associated memory device(s) 64 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 64 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 64 may generally be configured to store suitable computer-readable instructions that, when implemented by the processor(s) 62, configure the controller 36 to perform various functions including, but not limited to, directly or indirectly transmitting suitable control signals to one or more switches 306, monitoring overvoltage and/or islanding conditions of the electrical system 206, and various other suitable computer-implemented functions.

Additionally, the controller 36 may also include a communications module 66 to facilitate communications between the controller 36 and the various components of the electrical system 206 and/or the one or more sources of electrical generation 102. For instance, the communications module 66 may serve as an interface to permit the controller 36 to transmit control signals to the one or more switches 306 to change to a conducting or non-conducting state. Moreover, the communications module 66 may include a sensor interface 68 (e.g., one or more analog-to-digital converters) to permit signals transmitted from the sensors (e.g., 58, 60) to be converted into signals that can be understood and processed by the processors 62. Alternatively, the controller 36 may be provided with suitable computer readable instructions that, when implemented by its processor(s) 62, configure the controller 36 to calculate and/or estimate whether a detected overvoltage condition of the electrical system 206 is the result of islanding of the one or more sources of electrical generation based on information stored within its memory 64 and/or based on other inputs received by the controller 36.

Figure 5:
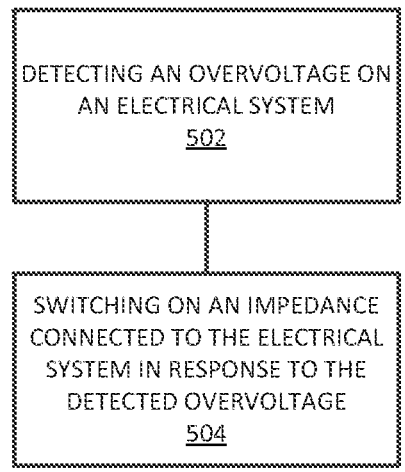
FIG. 5 illustrates one embodiment of a method for overvoltage protection of an electrical system.

Referring now to FIG. 5, there is illustrated one embodiment of a method for overvoltage protection of an electrical system. This embodiment may be implemented by the controller 36 or other computing device. As shown, the method generally includes step 502, detecting an overvoltage on an electrical system. Generally, this is accomplished by the controller 36 receiving one or more signals that indicate the presence of an overvoltage condition. In one aspect, the controller 36 can determine that the overvoltage is caused by an islanding of one or more sources of electrical generation 102. In one aspect, detecting the overvoltage condition on the electrical system comprises detecting when a voltage on the electrical system meets or exceeds a voltage threshold value. For example, the voltage threshold value can be adjustable and can be set at 1%, 5%, 10%, 15% or any other value over the nominal voltage of the electrical system. In one aspect, a delay in overvoltage protection may be implemented in order to avoid acting on signals that may be mere noise rather than an actual overvoltage condition. Alternatively, at step 502, a grid islanding event may be detected (not shown in FIG. 5). This event may be detected by overvoltage or by other signals not associated with overvoltage such as, for example, reverse power flow, sharp swings in phase angle, and the like. Embodiments of the present invention include current methods and systems to detect grid islanding as well as those that may be later developed. At step 504, an impedance connected to the electrical system is switched on in response to the detected overvoltage, wherein the impedance clamps voltage on the electrical system. In one aspect, switching on, in response to the detected overvoltage condition, an impedance connected to the electrical system, wherein the impedance clamps voltage on the electrical system comprises switching on the impedance using one or more electronic or mechanical switches or combinations thereof. In one non-limiting example, the electronic switches can comprise one or more silicon controlled rectifiers (SCRs). In one aspect, switching on, in response to the detected overvoltage condition, an impedance connected to the electrical system, wherein the impedance clamps voltage on the electrical system comprises switching on an impedance connected between each phase of a poly-phase electrical system. In one aspect, the impedance connected between each phase of a poly-phase electrical system is sized based at least in part on a voltage of the electrical system, a grid impedance of the electrical system, current supplied by any sources of electrical generation connected to the electrical system, and a desired clamping level of the overvoltage condition. In one aspect, switching on, in response to the detected overvoltage condition, an impedance connected to the electrical system, wherein the impedance clamps voltage on the electrical system comprises switching on an impedance comprised at least in part of one or more inductors.

Figure 6:
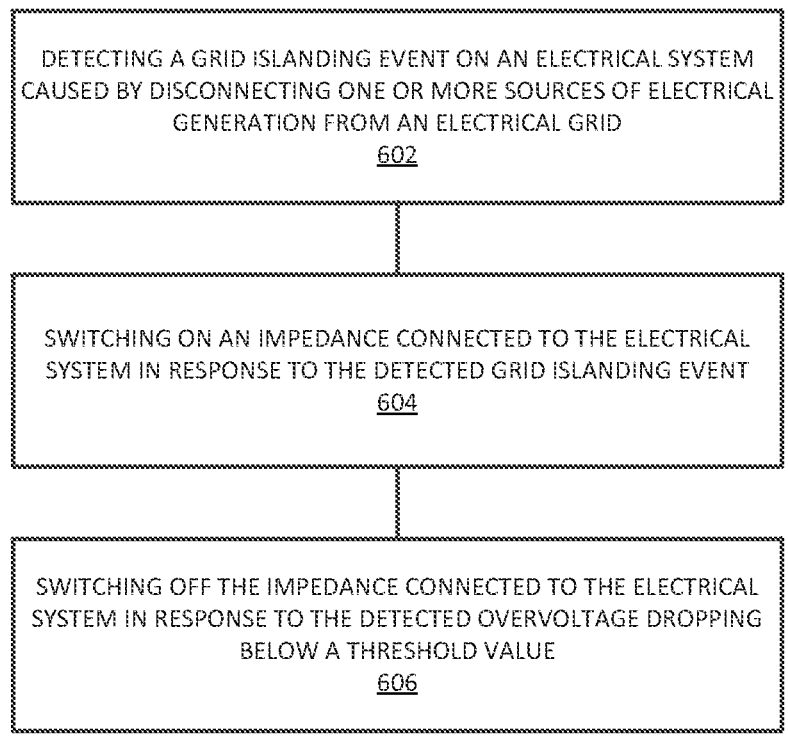
FIG. 6 illustrates an embodiment of a method for overvoltage protection for a grid-islanding event of an electrical system.

FIG. 6 illustrates an embodiment of a method for overvoltage protection for a grid-islanding event of an electrical system. This embodiment may also be implemented by the controller 36 or other computing device. At step 602, a grid islanding event is detected on an electrical system, wherein the grid islanding comprises disconnecting one or more sources of electrical generation from an electrical grid. As noted above, detecting a grid islanding event can be performed by systems and methods now known in the art or those later developed. At step 604, an impedance connected to the electrical system is switched on in response to the detected grid islanding event. In one aspect, the impedance is connected between each phase of a poly-phase electrical system, wherein an overvoltage event caused by the grid islanding is limited by the impedance clamping voltage on the poly-phase electrical system. At step 606, the impedance connected to the electrical system is switched off when the overvoltage event drops below a threshold voltage value.

As described above and as will be appreciated by one skilled in the art, embodiments of the present invention may be configured as a system, method, or a computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the processor(s) 62 discussed above with reference to FIG. 4, to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus (e.g., processor(s) 62 of FIG. 4) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method of overvoltage protection comprising:
   detecting an overvoltage condition on a poly-phase electrical system resulting from islanding of one or more sources of electrical generation from an electrical grid by detecting when a voltage on the electrical system meets or exceeds a voltage threshold value; and
   switching on, in response to the detected overvoltage condition, an impedance connected to the electrical system, wherein said impedance clamps and divides voltage on the electrical system between individual phases of the poly-phase electrical system.

2. The method of claim 1, wherein the one or more sources of electrical generation comprise one or more wind turbine generators.

3. The method of claim 1, wherein switching on, in response to the detected overvoltage condition, an impedance connected to the electrical system, wherein said impedance clamps voltage on the electrical system comprises switching on the impedance using one or more electronic or mechanical switches or combinations thereof.

4. The method of claim 3, wherein switching on, in response to the detected overvoltage condition, an impedance connected to the electrical system, wherein said impedance clamps voltage on the electrical system comprises switching on the impedance using one or more silicon controlled rectifiers (SCRs).

5. The method of claim 1, wherein the impedance connected between each phase of a poly-phase electrical system is sized based at least in part on a voltage of the electrical system, a grid impedance of the electrical system, current supplied by any sources of electrical generation connected to the electrical system, and a desired clamping level of the overvoltage condition.

6. The method of claim 1, wherein switching on, in response to the detected overvoltage condition, an impedance connected to the electrical system, wherein said impedance clamps voltage on the electrical system comprises switching on an impedance comprised at least in part of one or more inductors.

7. A method of overvoltage protection for a grid-islanding event comprising:
    detecting a grid islanding event on a poly-phase electrical system, wherein said grid islanding event comprises disconnecting one or more sources of electrical generation from an electrical grid; and
    switching on, in response to the detected grid islanding event, an impedance connected between each phase of the poly-phase electrical system, wherein an overvoltage on the poly-phase electrical system caused by the grid islanding event is limited by said impedance clamping and dividing voltage between individual phases of the poly-phase electrical system.

8. The method of claim 7, further comprising switching off said impedance connected between each phase of the poly-phase electrical system when the overvoltage drops below a threshold voltage value.

9. The method of claim 7, wherein switching on, in response to the detected grid islanding event, the impedance connected between each phase of the poly-phase electrical system, wherein the overvoltage on the poly-phase electrical system caused by the grid islanding event is limited by said impedance clamping voltage on the poly-phase electrical system comprises switching on the impedance using one or more electronic or mechanical switches or combinations thereof.

10. The method of claim 9, wherein switching on, in response to the detected grid islanding event, the impedance connected between each phase of the poly-phase electrical system, wherein the overvoltage on the poly-phase electrical system caused by the grid islanding event is limited by said impedance clamping voltage on the poly-phase electrical system comprises switching on the impedance using one or more silicon controlled rectifiers (SCRs).

11. The method of claim 7, wherein the impedance connected between each phase of a poly-phase electrical system is sized based at least in part on a voltage of the poly-phase electrical system, a grid impedance of the poly-phase electrical system, current supplied by the one or more sources of electrical generation connected to the poly-phase electrical system, and a desired clamping level of the overvoltage condition.

12. The method of claim 7, wherein switching on, in response to the detected grid islanding event, the impedance connected between each phase of the poly-phase electrical system, wherein the overvoltage on the poly-phase electrical system caused by the grid islanding event is limited by said impedance clamping voltage on the poly-phase electrical system comprises switching on an impedance comprised at least in part of one or more inductors.

13. A system for overvoltage protection of a poly-phase electrical system, comprising:
    one or more impedance elements;
    one or more switches in series with the one or more impedance elements; and
    a controller, wherein said controller is configured to:
        receive an indication of a detection of an overvoltage condition on an electrical system resulting from islanding of one or more sources of electrical generation from an electrical grid by detecting when a voltage on the electrical system meets or exceeds a voltage threshold value; and
        cause the one or more switches to connect the one or more impedance elements between individual phases of the poly-phase electrical system of the electrical system in response to receiving the indication of the detected overvoltage condition, wherein said overvoltage condition is limited by said one or more impedance elements clamping and dividing voltage on the electrical system.

14. The system of claim 13, wherein the one or more sources of electrical generation comprise one or more wind turbine generators.

15. The system of claim 13, wherein the impedance element connected between each phase of the poly-phase electrical system is sized based at least in part on a voltage of the electrical system, a grid impedance of the electrical system, current supplied by any sources of electrical generation connected to the electrical system, and a desired clamping level of the overvoltage condition.

* * * * *